United States Patent
Cho et al.

(10) Patent No.: US 8,447,346 B2
(45) Date of Patent: May 21, 2013

(54) SDR TERMINAL AND RECONFIGURATION METHOD

(75) Inventors: Eun Seon Cho, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 970 days.

(21) Appl. No.: 12/509,291

(22) Filed: Jul. 24, 2009

(65) Prior Publication Data

US 2010/0138824 A1 Jun. 3, 2010

(30) Foreign Application Priority Data

Dec. 1, 2008 (KR) ........................ 10-2008-0120654

(51) Int. Cl.
*H04M 1/00* (2006.01)
(52) U.S. Cl.
USPC ...................................... 455/550.1
(58) Field of Classification Search
USPC ........ 455/73, 234.1, 552.1, 436, 84; 709/220, 709/223; 714/799; 711/101, 173; 717/174; 370/310, 244
See application file for complete search history.

(56) References Cited

U.S. PATENT DOCUMENTS

| | | | |
|---|---|---|---|
| 2005/0108382 A1* | 5/2005 | Murotake et al. | 709/223 |
| 2006/0154691 A1* | 7/2006 | Tang et al. | 455/552.1 |
| 2008/0253434 A1* | 10/2008 | March et al. | 375/220 |
| 2008/0278197 A1* | 11/2008 | Murotake | 326/38 |

FOREIGN PATENT DOCUMENTS

| | | |
|---|---|---|
| KR | 100286008 B1 | 1/2001 |
| KR | 1020020071217 A | 9/2002 |
| KR | 1020060104330 A | 10/2006 |

* cited by examiner

*Primary Examiner* — Kiet Doan

(57) ABSTRACT

A Software Communications Architecture (SCA)-based software-defined radio (SDR) terminal and a reconfiguration method thereof are provided. The SDR terminal includes a software module including first and second hardware modules that are programmable and a memory storing at least one wireless access application; and a software module including a reconfiguration core framework that perform a service mode switch using the wireless access application, wherein, if a service mode switch from a first service mode to a second service mode occurs, the SDR terminal installs a wireless access application corresponding to the second service mode in one of the first and second hardware modules.

7 Claims, 5 Drawing Sheets

SDR TERMINAL AND RECONFIGURATION METHOD

CROSS-REFERENCE TO RELATED APPLICATION

This application claims priority from Korean Patent Application No. 10-2008-120654 filed on Dec. 1, 2008 in the Korean Intellectual Property Office, the disclosure of which is incorporated herein by reference in its entirety.

BACKGROUND OF THE INVENTION

1. Field of the Invention

The present invention relates to a software-defined radio (SDR) terminal for switching from one service mode to another and a reconfiguration method thereof.

The present invention was supported by the IT R&D program of Ministry of Information and Communication (MIC) and Institute for Information Technology Advancement (IITA) [Project No.: 2006-S-012-03, Project Title: Development of Middleware Platform for SDR Terminal]

2. Description of the Related Art

The Software Communications Architecture (SCA) is a standardized communication software architecture framework designed by the U.S. Joint Tactical Radio System (JTRS) Joint Program Office (JPO) to improve the interoperability between various communication systems and reduce software development and installation costs. SCA adopts the Real-Time Operating System (RTOS) and the Common Object Request Broker Architecture (CORBA) as middleware and thus provides an operating environment for different types of hardware devices and software programs.

SCA is not a standard restricted to certain systems but an independent system-design framework.

SCA-based communication systems such as software-defined radio (SDR) systems adopt SCA as a software framework standard. In SCA, an application is a class for grouping, installing, and executing a plurality of components that perform a wireless access service function. The performance of a SDR terminal may be considerably affected by how to configure application or download method, and, store method, and how to reconfigure a system.

A few SCA-based systems have been developed, and the debugging and optimization of the SCA-based systems is now under way.

However, SCA does not provide software component technology, any mechanism for storing or managing component files that can be installed and replaced or any method for switching from one service mode to another service mode using software.

SUMMARY OF THE INVENTION

The present invention provides a Software Communications Architecture (SCA)-based software-defined radio (SDR) terminal and a reconfiguration method thereof which can realize a fast and smooth mode switch between a plurality of wireless access service modes.

According to an aspect of the present invention, there is provided an SDR terminal including a software module including first and second hardware modules that are programmable and a memory storing at least one wireless access application; and a software module including a reconfiguration core framework that perform a service mode switch using the wireless access application, wherein, if a service mode switch from a first service mode to a second service mode occurs, the SDR terminal installs a wireless access application corresponding to the second service mode in one of the first and second hardware modules.

According to another aspect of the present invention, there is provided a reconfiguration method of an SDR terminal, the reconfiguration method including setting one of a plurality of wireless access service modes that are available as an active mode and setting another one of the available wireless access service modes as an inactive mode; installing a wireless access application corresponding to the active mode in a first hardware mode and installing a wireless access application corresponding to the standby mode in a second hardware mode, the first and second hardware modes being programmable; and driving the first hardware module.

According to the present invention, it is possible to design an SDR terminal including a software module having an SCA-based core framework and a reconfiguration module and a hardware module having two digital signal processors (DSPs) and two field-programmable gate arrays (FPGAs) and thus to quickly and smoothly switch from one service mode to another service mode. In addition, it is possible to simplify software and reduce the time taken to switch from one service mode to another service mode.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

Figure 1:
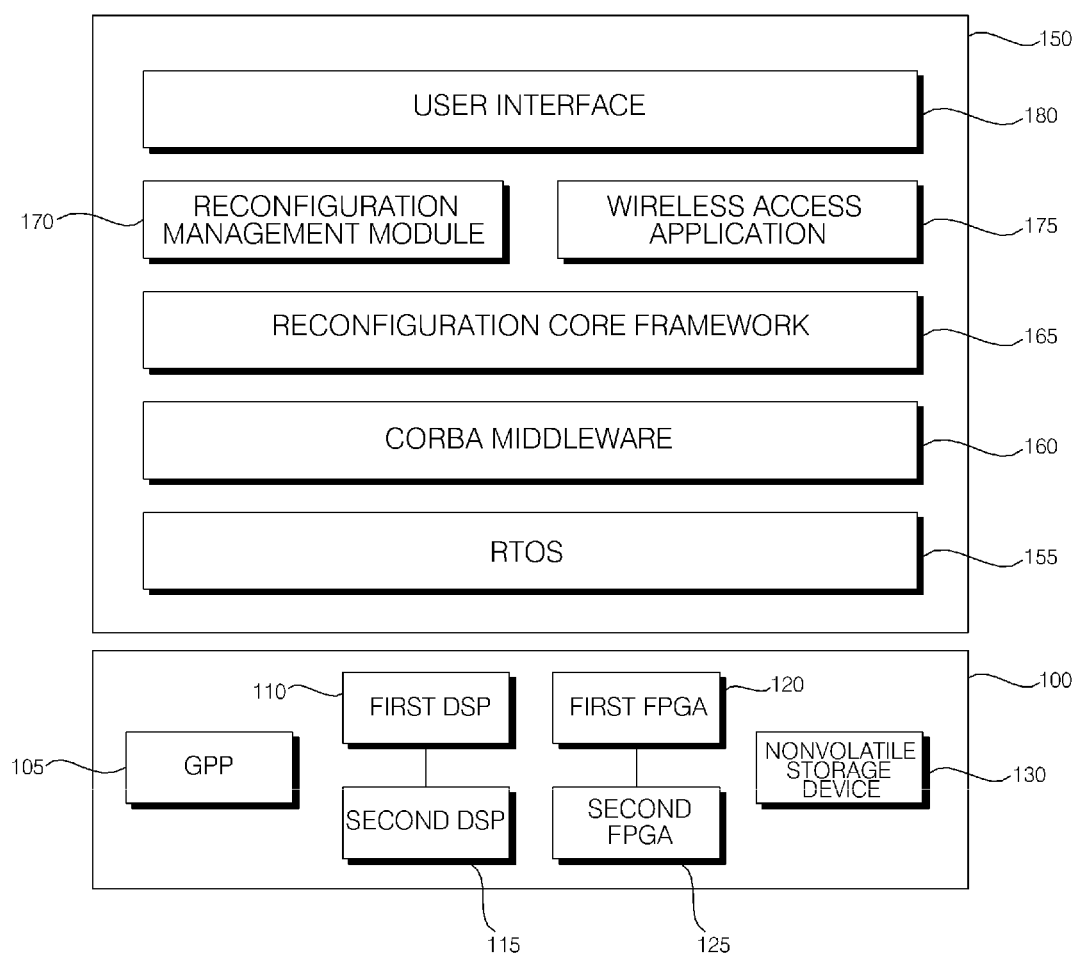
FIG. 1 illustrates a block diagram of a software-defined radio terminal according to an exemplary embodiment of the present invention.

FIG. 1 illustrates a block diagram of a software-defined radio (SDR) terminal according to an exemplary embodiment of the present invention. Referring to FIG. 1, the SDR terminal may include a hardware module 100 and a software module 150.

The hardware module 100 may include a general-purpose processor (GPP) 105, a first digital signal processor (DSP) 110, a second DSP 115, a first field programmable gate array (FPGA) 120, a second FPGA 125, and a nonvolatile storage device 130.

The first and second FPGAs 120 and 125 are programmable integrated circuits that can be driven using a control program downloaded from the software module 150. The first and second digital signal processors 110 and 115 may perform a communication function. In general, the SDR terminal may be driven in one wireless access service mode at one time. Since the SDR terminal includes two DSPs and two FPGAs, the SDR terminal can quickly change its wireless access service mode.

More specifically, the SDR terminal may include two DSPs, i.e., the first and second DSPs 110 and 115, and two FPGAs, i.e., the first and second FPGAs 120 and 125.

While driving, for example, the first DSP 110 and the first FPGA 120, the SDR terminal may download a wireless access application corresponding to a wireless access service mode desired by a user into the second DSP 115 and the second FPGA 125, respectively, and may thus be able to quickly switch to the desired wireless access service mode.

The nonvolatile storage device 130 may store one or more wireless access applications respectively corresponding to a number of wireless access service modes that can be used in the SDR terminal. The wireless access applications may have been downloaded from a wired or wireless network or copied from another storage device such as a smart card. The nonvolatile storage device 130 can retain information stored therein even when power is cut off. Examples of the nonvolatile storage device 130 include a read-only memory (ROM), a magnetic tape, a magnetic core, a magnetic disc and a magnetic cylinder.

The wireless access applications present in the nonvolatile storage device 130 may be appropriately distributed among the first DSP 110, the second DSP 115, the first FPGA 120 and the second FPGA 125 and may thus be executed.

For example, if two wireless access applications respectively corresponding to a first mode (i.e., an active mode) and a second mode (i.e., a standby mode) are chosen, the wireless access application corresponding to the first mode may be installed in the first DSP 110 and the first FPGA 120, respectively, and the wireless access application corresponding to the second mode may be installed in the second DSP 115 and the second FPGA 125.

If the user wishes to switch to the second mode while executing a wireless access service in the first mode, the GPP 105 may terminate the first mode, may deinstall the wireless access application corresponding to the first mode from the first DSP 110 and the first FPGA 120, and may execute the second mode installed in the second DSP 115 and the second FPGA 125, thereby providing a wireless access service to the user in the second mode.

It will hereinafter be described in detail how to switch from a first mode currently being executed to a third mode yet to be installed in the SDR terminal when the first mode is already installed in the first DSP 110 and the first FPGA 120 and a second mode is already installed in the second DSP 115 and the second FPGA 125.

The GPP 105 may terminate the first mode.

Thereafter, the GPP 105 may deinstall the wireless access application corresponding to the second mode from the second DSP 115 and the second FPGA 125.

Thereafter, the GPP 105 may install a wireless access application corresponding to the third mode in the second FPGA 125, may deinstall the wireless access application corresponding to the first mode from the first DSP 110 and the first FPGA 120, and may execute the third mode, thereby providing a wireless access service to the user in the third mode.

The software module 150 may include a Real-Time Operating System (RTOS) 155 and Common Object Request Broker Architecture (CORBA) middleware 160, which is defined by the Software Communications Architecture (SCA).

The RTOS 155 is an operating system for processing multiple programs. The RTOS 155 may process multiple programs in the foreground with a high priority, and may perform batch-processing on multiple programs in the background with a low priority.

The RTOS 155 may automatically perform the input and output of a program and may use a main-memory allocation method.

The CORBA middleware 160 is an Object Request Broker (ORB) standard defined by the Object Management Group (OMG).

The ORB is one of the five core elements of the Object Management Architecture (OMA), which is a basic architecture for a distributed object system defined by the OMG, and processes communications between objects in a distributed object environment A reconfiguration core framework 165 may exist in a layer above the RTOS 155 and the CORBA middleware 160 and may be based on the SCA. The reconfiguration core framework 165 may include various components such as a domain manager, a device, an application factory and a domain profile and may support the reconfiguration of a system.

A reconfiguration management module 170 may perform various service mode switch-related functions along with the reconfiguration core framework 165 upon receiving a request for a service mode switch from a user interface 180.

A wireless access application 175 may be a wireless access service mode currently being executed. The wireless access application 175 may include a plurality of components and may be implemented as a package. The wireless access application 175 may be stored in the nonvolatile storage device 130, and may perform a wireless access function by being installed and driven in a device at the user's request.

Application package information, component package information and component information may be written into eXtensible Markup Language (XML) files.

The user interface 180 may display a menu or information for switching between a number of wireless access service modes that are available to the user, and may receive various commands such as a command to switch from one wireless access service mode to another.

Figure 2:
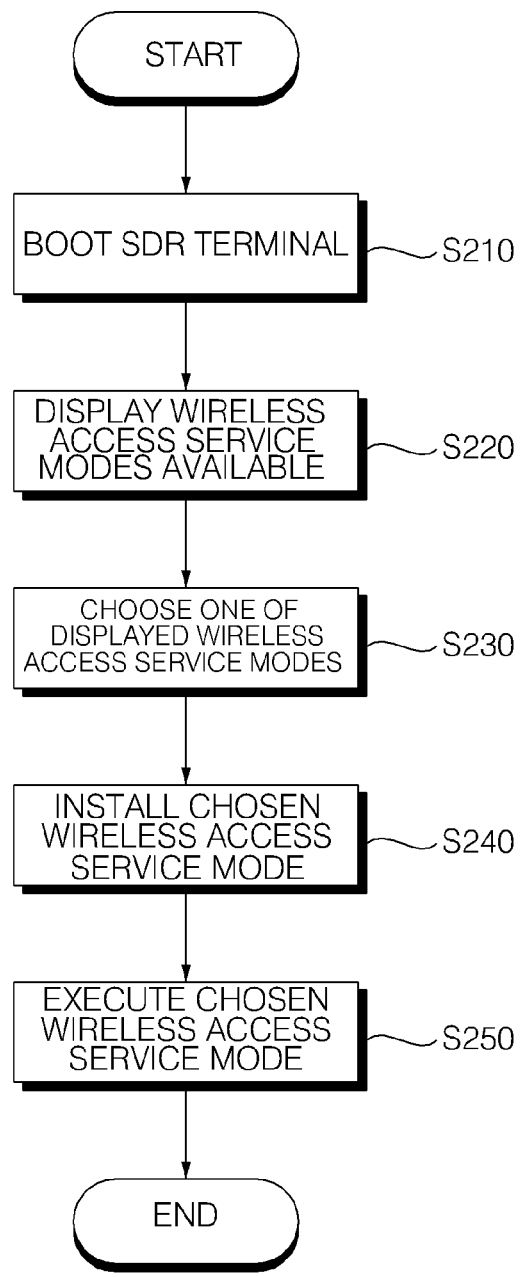
FIG. 2 illustrates a flowchart of a reconfiguration method of an SDR terminal according to an exemplary embodiment of the present invention.

FIG. 2 illustrates a flowchart of a reconfiguration method of an SDR terminal according to an exemplary embodiment of the present invention. Referring to FIG. 2, if the user boots the SDR terminal (S210), the user interface 180 may display a number of wireless access service modes that are available to the user (S220).

The available wireless access service modes displayed by the user interface 180 may correspond to the wireless access applications present in the nonvolatile storage device 130 of the hardware module 100.

Thereafter, if the user chooses one of the available wireless access service modes displayed by the user interface 180 (S230), the GPP 105 may install a wireless access application corresponding to the chosen wireless access service mode in the first or second FPGA 120 or 125 (S240).

The user may install a first mode, which is to be used as an active mode, and a second mode, which is to be used as a standby mode, using the user interface 80. In this case, if the user chooses the first and second modes, the user interface 180 may issue a service initialization command to the reconfiguration management module 170.

The reconfiguration management module 170 may issue a command to install each of the first and second modes to the reconfiguration core framework 165. The reconfiguration core framework 165 may withdraw the wireless access service mode applications respectively corresponding to the first and second modes from the nonvolatile storage device 130, and may install the wireless access applications respectively corresponding to the first and second modes in the first and second FPGAs 120 and 125 with reference to an XML domain profile.

Thereafter, the reconfiguration core framework 165 may execute whichever of the wireless access services installed in the first and second FPGAs 120 and 125 corresponds to an active mode (S250).

Figure 3:
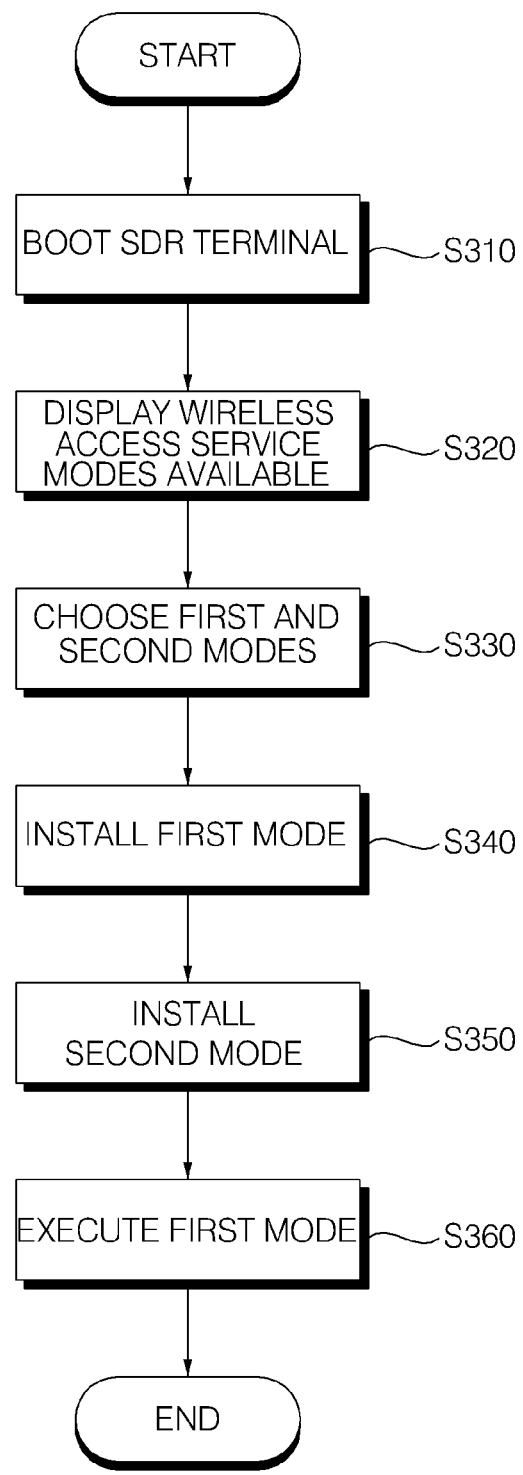
FIG. 3 illustrates a flowchart of a reconfiguration method of an SDR terminal according to another exemplary embodiment of the present invention.

FIG. 3 illustrates a flowchart of a reconfiguration method of an SDR terminal according to another exemplary embodiment of the present invention. Operations S310 through S330 are the same as their respective counterparts shown in FIG. 2, and thus, detailed descriptions thereof will be skipped. The exemplary embodiment of FIG. 3 will hereinafter be described, focusing mainly on differences with the exemplary embodiment of FIG. 2.

Referring to FIG. 3, if the user boots the SDR terminal (S310), the user interface 180 may display a number of wireless access service modes that are available to the user (S320).

Thereafter, the user chooses one or more wireless access service modes and may prioritize the chosen wireless access service modes (S330).

The chosen wireless access service modes may include first and second modes. The first mode may be an active mode, and the second mode may be a standby mode.

In this manner, once the user installs the first and second modes, the reconfiguration management module 170 may withdraw a wireless access application corresponding to the first mode from the nonvolatile storage device 130 and may install the withdrawn wireless access application in the GPP 105, the first DSP 110 and the first FPGA 120 with reference to an XML domain profile (S340).

Thereafter, the reconfiguration management module 170 may withdraw a wireless access application corresponding to the second mode from the nonvolatile storage device 130, and may provide the withdrawn wireless access application to the reconfiguration core framework 165. Thereafter, the reconfiguration core framework 165 may install the wireless access application corresponding to the second mode in the GPP 105, the second DSP 115 and the second FPGA 125 (S350).

Once the installation of the wireless access applications respectively corresponding to the first and second modes is complete, the reconfiguration management module 170 may issue a command to drive the first mode to the reconfiguration core framework 165 so that the first mode can be executed (S360).

Figure 4:
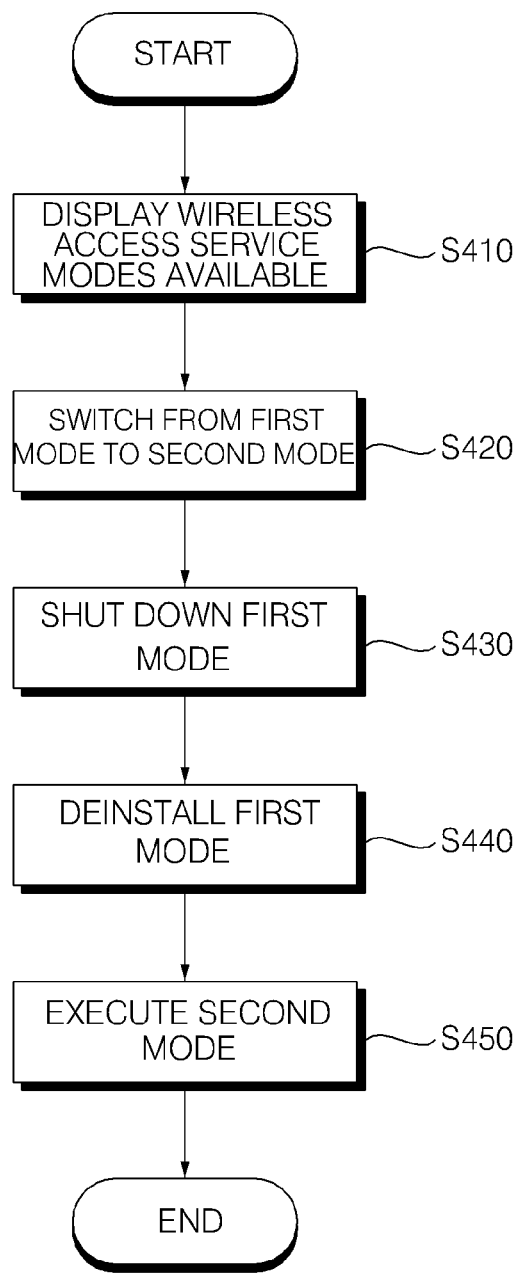
FIG. 4 illustrates a flowchart a reconfiguration method of an SDR terminal when a service mode switch occurs, according to an exemplary embodiment of the present invention.

FIG. 4 illustrates a flowchart of a reconfiguration method of an SDR terminal when a service mode switch occurs, according to an exemplary embodiment of the present invention. More specifically, FIG. 4 illustrates a flowchart of a reconfiguration method of an SDR terminal when the user wishes to switch from a first mode currently being executed to a second mode already installed in the SDR terminal.

Referring to FIG. 4, the user interface 180 may display a number of wireless access service modes that are available to the user (S410). The user may choose one of the wireless access service modes, e.g., the second mode, and may perform a service mode switch from the first mode to the second mode (S420).

Then, the reconfiguration management module 170 may issue an operation termination command to the reconfiguration core framework 165, may terminate a wireless access service currently being performed, and may shut down the first mode (S430).

Thereafter, the reconfiguration core framework 165 may deinstall the application instances corresponding to the first mode (S440).

Once the first mode is successfully deinstalled, the reconfiguration management module 170 may issue a command to drive the second mode to the reconfiguration core framework 165, and the reconfiguration core framework 165 may generate a plurality of application instances corresponding to the second mode, and may execute the second mode (S450).

Figure 5:
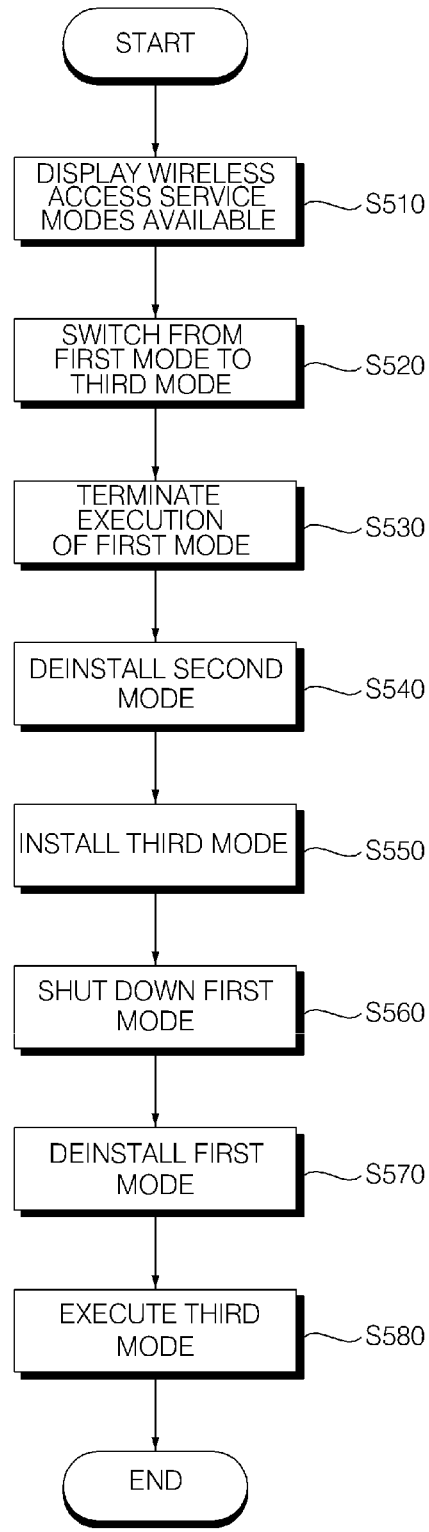
FIG. 5 illustrates a flowchart a reconfiguration method of an SDR terminal when a service mode switch occurs, according to another exemplary embodiment of the present invention.

FIG. 5 illustrates a flowchart of a reconfiguration method of an SDR terminal when a service mode switch occurs, according to another exemplary embodiment of the present invention. More specifically, FIG. 5 illustrates a flowchart of a reconfiguration method of an SDR terminal when the user wishes to switch from a first mode currently being executed to a third mode yet to be installed in the SDR terminal when the first mode and a second mode are already installed in the SDR terminal.

Referring to FIG. 5, the user interface 180 may display a number of wireless access service modes that are available to the user (S510). The user may choose one of the wireless access service modes, e.g., the third mode, and may perform a service mode switch from the first mode to the third mode (S520).

Then, the reconfiguration management module 170 may issue an operation termination command to the reconfiguration core framework 165, may terminate a wireless access service currently being provided, and may shut down the first mode (S530).

Thereafter, the reconfiguration management module 170 may issue a command to deinstall the second mode to the reconfiguration core framework 165, and the reconfiguration core framework 165 may deinstall the second mode from the GPP 105, the second DSP 115, and the second FPGA 125 (S540).

Once the second mode is successfully deinstalled, the reconfiguration core framework 165 may withdraw a wireless access application corresponding to the third mode from the nonvolatile storage device 130 and may install the withdrawn wireless access application in the GPP 105, the second DSP 115 and the second FPGA 125 (S550).

Once the wireless access application corresponding to the third mode is successfully installed, the reconfiguration management module 170 may issue a command to shut down the first mode to the reconfiguration core framework 165 (S560), and the reconfiguration core framework 165 may deinstall the application instances corresponding to the first mode (S570).

Once the first mode is successfully deinstalled, the reconfiguration management module 170 may issue a command to drive the third mode to the reconfiguration core framework 165. Then, the reconfiguration core framework 165 may generate a plurality of application instances corresponding to the third mode, and the reconfiguration management module 170 may issue a command to execute the third mode to the reconfiguration core framework 165 so that the third mode can be executed (S580).

The present invention can be applied to an SDR-based wireless network.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A software-defined radio (SDR) terminal comprising:
a software module including first and second hardware modules that are programmable and a memory storing at least one wireless access application; and a software module including a reconfiguration core framework that perform a service mode switch using the wireless access application, wherein, if a service mode switch from a first wireless access application corresponding to a first service mode installed in the first hardware module to a second wireless access application corresponding to a second service mode installed in the second hardware module occurs, the SDR terminal terminates the first service mode, deinstalls the first service mode from the first hardware module, and executes the second service mode, wherein, if a service mode switch from the first service mode installed in the first hardware module to a third service mode occurs, the SDR terminal terminates the first service mode, deinstalls the second service mode from the second hardware module, installs a third wireless access application corresponding to the third service mode in the second hardware module and executes the third service mode.

2. The SDR terminal of claim 1, wherein the software module further includes a Real-Time Operating System (RTOS), Common Object Request Broker Architecture (COBRA) middleware and a user interface.

3. The SDR terminal of claim 2, further comprising a reconfiguration management module issuing a request for a service mode switch to the reconfiguration core framework upon receiving a request for a service mode switch through the user interface.

4. The SDR terminal of claim 1, wherein at least one of the first or second wireless access application includes at least one component and is implemented as a single package.

5. The SDR terminal of claim 1, wherein the first hardware module includes a first digital signal processor (DSP) and a first field-programmable gate array (FPGA) and the second hardware module includes a second DSP and a second FPGA.

6. A reconfiguration method of an SDR terminal, the reconfiguration method comprising:

setting one of a plurality of wireless access service modes that are available as an active mode and setting another one of the available wireless access service modes as an inactive mode;

installing a wireless access application corresponding to the active mode in a first hardware mode and installing a wireless access application corresponding to the standby mode in a second hardware mode, the first and second hardware modes being programmable; and driving the first hardware module, wherein, if a request for the execution of the inactive mode is received during the execution of the active mode, shutting down the first hardware module, deinstalling the wireless access application corresponding to the active mode, and driving the second hardware module, wherein, if a service mode switch from the first service mode installed in the first hardware module to a third service mode occurs, the SDR terminal terminates the first service mode, deinstalls the second service mode from the second hardware module, installs a third wireless access application corresponding to the third service mode in the second hardware module, and executes the third service mode.

7. The reconfiguration method of claim 6, further comprising:

if a request for the execution of a third mode not installed in any one of the first and second hardware modules is received, terminating the driving of the first hardware module, deinstalling a wireless access application corresponding to the inactive mode from the second hardware module, loading a wireless access application corresponding to the third mode in the second hardware module, and driving the second hardware module.

* * * * *